United States Patent [19]
Meikle et al.

[11] Patent Number: 6,070,358
[45] Date of Patent: Jun. 6, 2000

[54] SEED GERMINATION SYSTEM

[76] Inventors: Robert Andrew Ross Meikle, 15 West Fenton Gait, Gullane, East Lothian, EH31 2HS; David Smith, 121A Inveresk Road, Musselburgh EH217AV, both of United Kingdom

[21] Appl. No.: 09/022,947

[22] Filed: Feb. 12, 1998

Related U.S. Application Data

[60] Provisional application No. 60/038,351, Feb. 12, 1997.

[51] Int. Cl.⁷ ...................................................... A01G 9/10
[52] U.S. Cl. ............................................................. 47/56
[58] Field of Search .................................. 47/56, 61, 74, 47/15

[56] References Cited

U.S. PATENT DOCUMENTS

| | | | |
|---|---|---|---|
| 2,309,702 | 2/1943 | Kirschenbaum | 47/56 |
| 2,323,746 | 7/1943 | Woolf et al. | 47/56 |
| 2,648,165 | 8/1953 | Nestor | 47/56 |
| 3,160,986 | 12/1964 | Watson et al. | 47/56 |
| 3,257,754 | 6/1966 | Ohsol | 47/56 |
| 3,299,566 | 1/1967 | MacMullen | 47/1.01 R |
| 3,305,968 | 2/1967 | Dosedla et al. | |
| 3,557,491 | 1/1971 | Franklin et al. | |
| 3,638,393 | 2/1972 | Datta | |
| 3,981,100 | 9/1976 | Weaver et al. | 47/58.1 |
| 4,007,556 | 2/1977 | Gluck et al. | 47/56 |
| 4,080,755 | 3/1978 | Crosby | 47/56 |
| 4,100,324 | 7/1978 | Anderson et al. | |
| 4,126,962 | 11/1978 | Polcaro | |
| 4,309,844 | 1/1982 | King et al. | 47/56 |
| 4,429,001 | 1/1984 | Kolpin et al. | |

FOREIGN PATENT DOCUMENTS

| | | |
|---|---|---|
| 0201087 | of 0000 | European Pat. Off. |
| 1582527 | of 0000 | Germany |
| 2152411 | of 0000 | Germany |
| 2158914 | of 0000 | Germany |
| 1041133 | of 0000 | United Kingdom |
| 1122402 | of 0000 | United Kingdom |
| 1165543 | of 0000 | United Kingdom |
| 1313121 | of 0000 | United Kingdom |
| 1388208 | of 0000 | United Kingdom |
| 1429711 | of 0000 | United Kingdom |
| 1475994 | of 0000 | United Kingdom |
| 1535854 | of 0000 | United Kingdom |
| 1562396 | of 0000 | United Kingdom |
| 1601557 | of 0000 | United Kingdom |
| 2089632 | of 0000 | United Kingdom |
| 2123663 | of 0000 | United Kingdom |
| 2163419 | of 0000 | United Kingdom |
| 2251167 | of 0000 | United Kingdom |
| WO9700003 | of 0000 | United Kingdom |
| WO97/00003 | 1/1997 | WIPO ................ 47/56 |

Primary Examiner—Michael J. Carone
Assistant Examiner—Francis T. Palo
Attorney, Agent, or Firm—Lalos & Keegan

[57] ABSTRACT

A seed-containing growth medium comprising a flexible carrier sheet and a cover sheet overlying the carrier sheet, a plurality of non circular containment zones being defined by contact points between the carrier sheet and cover sheet, at least a selected number of non circular containment zones containing a seed, wherein the physical characteristics of the carrier sheet are different from those of the cover sheet at least in the following respects: the carrier sheet has a higher water retentive capacity than the cover sheet and the cover sheet is more easily penetrated than the carrier sheet.

42 Claims, 2 Drawing Sheets

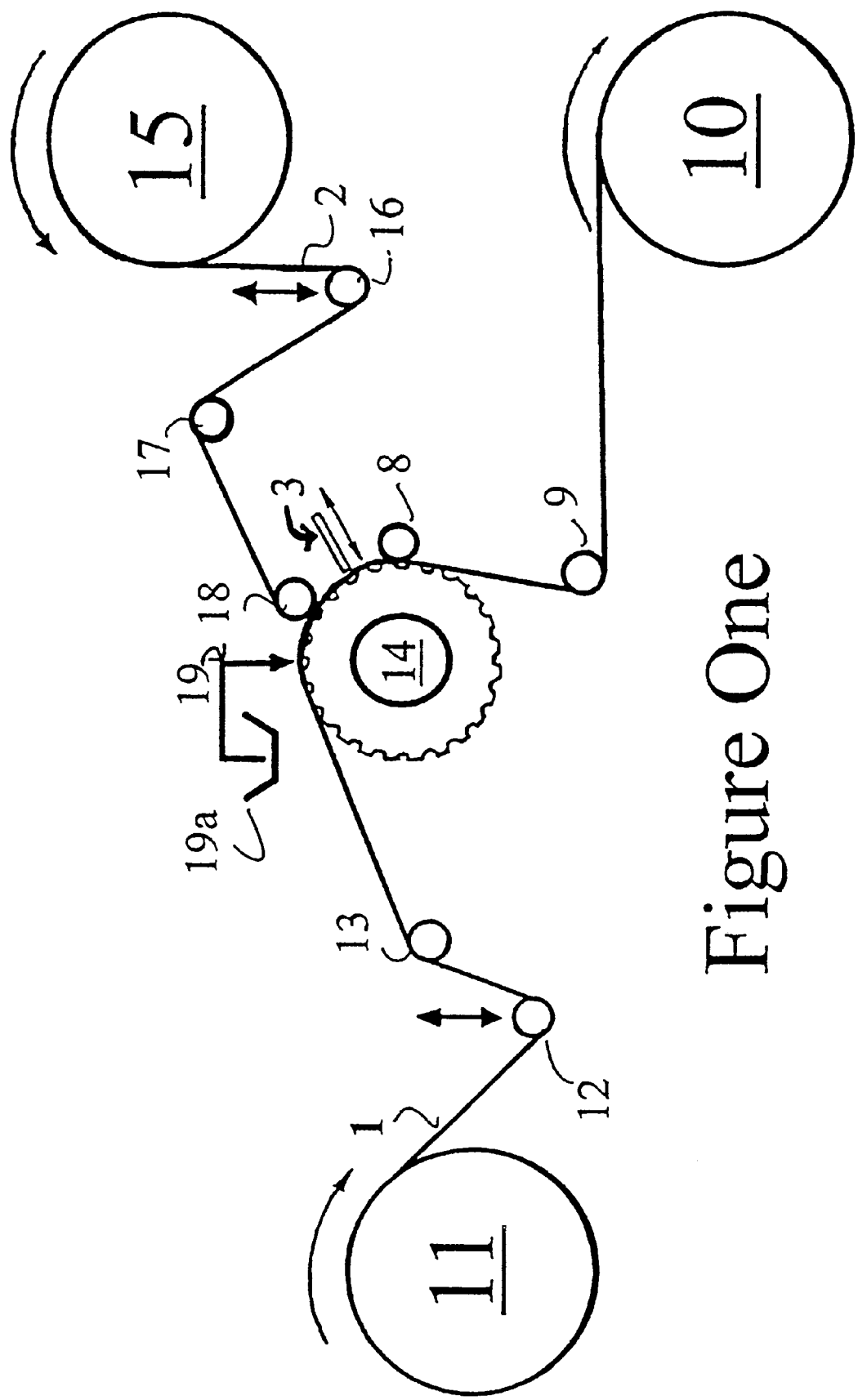
Figure One

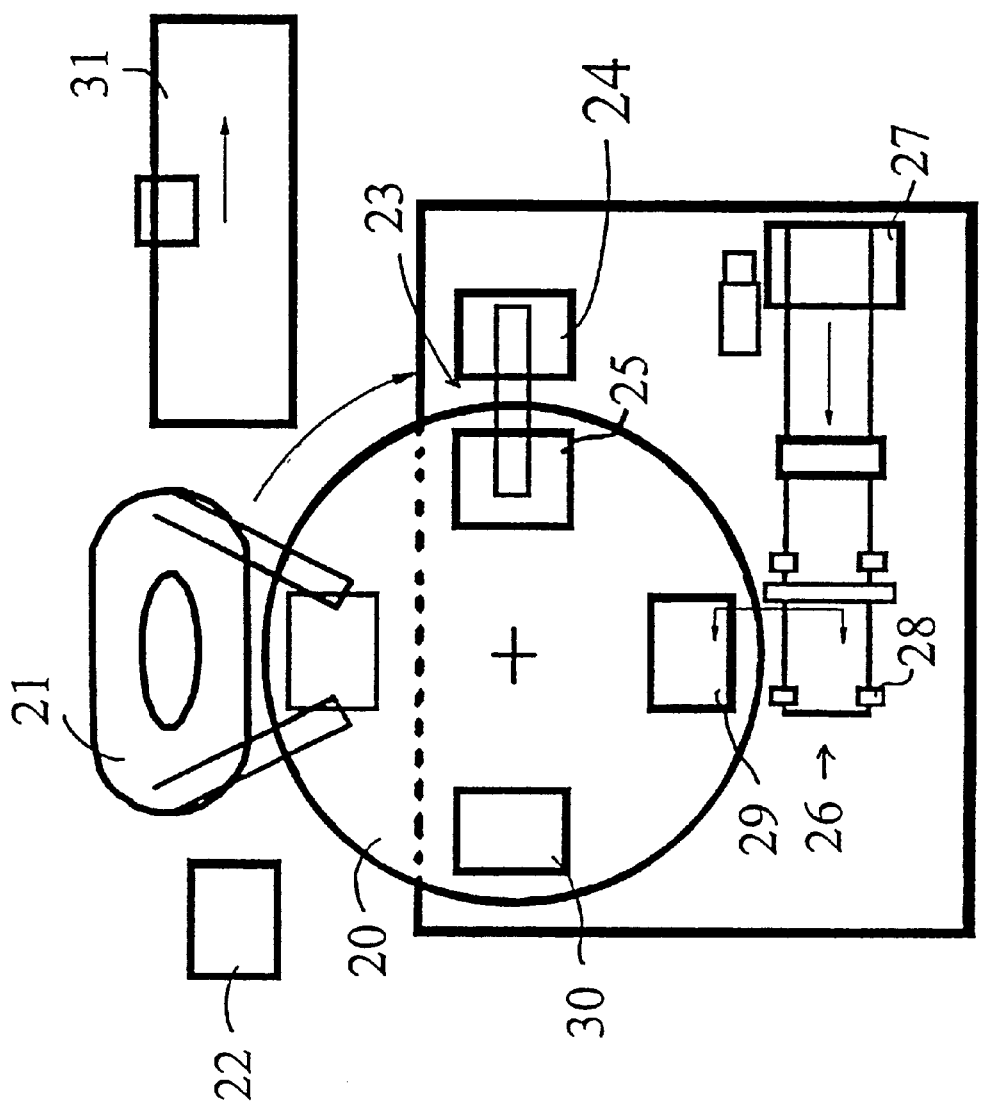
Figure Two

SEED GERMINATION SYSTEM

This application claims benefit of provisional application Ser. No. 60/038,351 filed Feb. 12, 1997.

This invention relates to an artificial system for promoting seed germination and in particular to a seed germination system using artificial growing mediums or a combination of artificial and natural growing mediums. The application finds greatest utility in connection with dicotyledons, especially those with small seeds, but is also useful for certain monocotyledons such as the onion family.

Attempts to germinate seeds in purely natural growth mediums (e.g. soil or compost based) tends to produce variable results due to sowing difficulties and the collective influence of environment factors. Earlier attempts at developing seed germination systems based on artificial growth media have alleviated some of the negative influences of poor sowing patterns and certain harsh natural environmental factors such as bird or animal attacks. However such earlier systems can also introduce other negative factors such as the placing of seeds into growing mediums with lower levels of inherent fertility and inadequate amounts of water retention that can impede seed germination and plant growth.

At this point it is helpful to define what is meant by the term "seed" for the purposes of this invention. Therefore the term "seed(s)" is intended to refer to any separate single dormant piece or particle of plant material that, if provided with suitable environmental conditions, is fully capable of producing at least one shoot or sprout plus at least one rooting system and eventually at least one fully grown plant. "Seed" may also refer to items such as:- pre-germinated or primed seeds, very small potato tubers, pieces of runner or rhizome, pieces produced from tissue culture, stem cuttings (e.g. sugar cane and other buds on nodes), multi-seeded fruits, (e.g. Coriander and Beets) or even fungal material such as mushroom spores, bulbs and corns etc.

Both U.S. Pat. No. 4,309,844 and GB 1 601 557 describe a grass seeding system utilizing an artificial growth medium and consisting of mixtures of grass seed species randomly spread and entrapped between two 0.75 mm sheets of open celled foamed plastics material fused together by applying a naked gas flame to one surface of one layer and immediately compressing the layers together between rollers to produce a seed mat that could be rolled out and pinned to suitably prepared ground and then watered to produce a lawn after only a few weeks.

However, although the upper layer of foam provided the seeds with some protection whilst still permitting young emerging grass shoots to break through the upper layer and the lower layer permits emerging grass radicles to penetrate and enter the soil beneath the seed mat, the close proximity of the seed to the atmosphere and inadequate moisture retention properties of the foam can lead to one of two undesirable outcomes, particularly in hot dry climates or periods. Either very frequent applications of water are required to sustain plant establishment before roots can properly establish in the soil beneath the mat or alternatively high death rates of young seedlings may occur in the absence of a constant water regime.

Furthermore this type of system is only suitable for seeds where high degrees of precision of spacing among individual seeds is not very critical such as in the case of grass seeds. The grass seeds can be uniquely responsive in this known system because they can tolerate congestion i.e. seeds can touch one another or have gaps as much as about 5 cm without adversely affecting germination and seedling growth or the appearance of the lawn grown eventually. However, this is not the case with most other plants which will suffer stunted growth or withering if competing for nutrients in such crowded conditions.

Other forms of existing seed germination systems include manufactured kits for small scale use. These usually consist of a seed tray (frequently with the addition of a transparent plastic canopy), a packet of seeds and a bag of growth media (compost). Occasionally the seed and compost supplied in the kit are mixed together. Where it is a reasonable objective of a seed germination kit user to produce a regular stand of evenly sized plants as cheaply and with as little effort on their part as possible, the aforementioned germination kit types suffered from several disadvantages.

In the case where the seeds and medium are separately supplied, the user has to sow the seeds to an acceptable degree of accuracy in terms of sowing depth and spacing within the time available for the task. It is possible to achieve high degrees of sowing precision by hand but it is a slow, cumbersome and inefficient process requiring fine motor control. The non-industrial user is unlikely to be able to justify use of any form of mechanical or automated sowing on economic grounds. Likewise such small scale kits cannot readily be adapted for large scale repopulation of land recovery sites, motorway or freeway edgings, or conversion of arable land to other purposes.

In the case where the seeds and growth media are premixed. The target of accurate sowing is an impossible task and the user is obliged to accept whatever depth and spacing can be achieved by spreading the mixture in the tray. Where sowing is so poorly controlled, some seeds will be too deep to emerge quickly if even at all. Other seeds will be far from neighbouring seeds allowing such seeds to produce seedlings that can grow larger than the mean size for the lot, while extremely closely sown seeds may result in seedlings much smaller than the said mean. This outcome is less than preferred and the higher the cost of the seeds concerned (and/or the greater the perceived value of uniformity among the resultant plants or plant products) the more undesirable reduced proportional germination of seeds and unevenly produced plant stands become.

GB 2 163 419 describes a horticultural nutrient product for placing around growing plants on the soil or other growing medium which is a porous substrate impregnated with a product incorporating a nutrient composition dispensed in a water soluble carrier such as a wax material like fatty acid ethoxylate. The product is generally a sheet of open celled foam plastics material such as polyurethane foam impregnated over its entire area and through at least part of its thickness with a nutrient composition. This product however is intended for use with established but immature plants, i.e. seedlings or saplings in the early stages of growth. It does not assist in the problems of seed sowing and nurturing during germination. That document is simply representative of a multitude of prior proposals for improving the chances of bringing established but immature plants to maturity.

The problems of sowing seeds, particularly very small seeds, accurately and achieving a high rate of germination with survival beyond the critical stages of seedling development to healthy immature plants, which would if necessary be able to be safely handled for replanting, remain a challenge despite the known art such as that cited above.

It should be noted that additional problems of some of the known proposals is that the products may be difficult to retain properly in the ground.

This invention sets out to address these problems and provide an improved seed handling system which alleviates the aforesaid difficulties. In particular it is an object of this invention to obviate or mitigate the problems associated with handling and sowing of very small seeds. A further object of this invention is to provide a product which offers the advantages of providing within the controlled conditions of the manufacturing facility the means of selecting the mutual spacing patterns of one or more types of the seeds concerned, provision of a certain level of physical protection for the seeds, introduction of a predetermined quantity of nutrients, fungicides, adjuvants and growth facilitating substances (hereinafter "growth aids"), and further provide the means of introducing the seeds to the intended site for growth and protect and nurture the seed through germination and beyond. A still further object of the invention is to provide an apparatus and manufacturing method for achieving the aforesaid purposes.

According to one aspect of the present invention there is provided a seed-containing growth medium comprising a flexible carrier sheet with an overlying cover sheet, the carrier sheet and cover sheet being attached at selected contact points to define a plurality of non circular containment zones between the sheets, at least a selected number of said zones containing a seed, wherein the physical characteristics of the carrier sheet are different from those of the cover sheet at least in the following respects: the carrier sheet has a higher water retentive capacity than the cover sheet and the cover sheet is more easily penetrated than the carrier sheet.

An advantage of seed-containing growth medium of this invention is that the emerging hook of a germinating dicotyledonous seed (usually formed from the plumule & epicotyl except for certain beans where it is the hypocotl), or the cotyledon of some monocotyledonous seeds (e.g. Onion), that lack the penetrating point of a germinating grass blade (coleoptile & first foliage leaf) can readily rupture the cover sheet whilst the root radicles of all types of species naturally progress into the carrier sheet and beyond to firstly form a primary root and then a secondary root structure.

Preferably the carrier sheet exhibits the property of superabsorbency towards water, e.g. having the properties of, or similar to hydrogels to encourage root development and avoid premature drying out thereof.

In the last decade a great deal of research has been conducted on superabsorbent materials for example in connection with packaging of seafood, manufacture of babies disposable diapers (nappies) and pharmaceutical deposit products. Therefore the literature reflects that a polymer chemist of appropriate skill can achieve a fair degree of control in manufacture of such materials. Therefore it is possible already to select polymeric materials which upon contact with water swell dramatically to absorb unexpectedly high volumes of water with respect to the original volume of the water-absorbant polymer. Such materials may exhibit a high fluid-retentive capacity i.e. essentially permanent retention or the swollen material may permit the absorbed fluid to remain relatively accessible. In the field of plant cultivation the latter materials are to be selected.

Application of such superabsorbent materials to plant growth has prompted production of granular water-absorbent materials for inclusion in growing containers usually in admixture with a natural or synthetic growing medium with varying degrees of success. It is also known to use such materials alone as a rooting gel for cuttings.

In the present invention the superabsorbent material is preferably incorporated in the carrier sheet but may alternatively or additionally be introduced to a proportion of the zones defined between the carrier and cover sheets.

Some examples of absorbency materials include clay, kaolin talc, calcium carbonate, sodium sulphate, sodium carbonate, and aluminium oxide.

Some examples of super absorbency materials include modified starch, cellulose, alginate, carboxy methyl cellulose and polyacrylic acid. The alginate is that formed from the process whereby a non-woven web of melt blown fibres have particles introduced into a stream of microfibers after the microfibers have been extruded. If the particles are of super absorbent material they are distributed substantially individually and spaced throughout the web and provide effective results when used as an absorbency material.

The carrier and cover sheets of this invention are preferably formed from a biodegradable material wherein the degree of biodegradation is controlled to provide a durability commensurate with the predicted germination period. This offers the advantage that after the seeds have become established plantlets or immature plants, there is little residual evidence of the seeding mechanism to contaminate the environment.

Thus, where the sheets are polymeric materials, additives which will in the course of time disrupt the polymeric structure are included, or the respective reactive components are adjusted initially such that the degree of cross-linking of a polymer matrix is such that gradual breakdown is a predictable eventuality.

Environmental pressure groups have caused various branches of industry to conduct research into biodegradation of materials in recent years. Therefore the literature suggests possible ways of adjusting the composition of materials such as polymers to ensure that when brought into contact with natural weathering conditions the materials have a predictable life-span with minimum residual impact on the environment.

In the present invention the controlled degradation of the carrier and cover sheets enables maximum protection for the seed during its vulnerable germination and establishment phases but minimum restriction to the maturing plant whose root system can freely expand into the soil in a natural way.

According to a further aspect of the invention the cover sheet is selectively coloured to influence the attention of fauna e.g. by discouraging deposit of eggs by female insects of species known to favour the plants of interest as nutritional sources for the larval stage, or to discourage the attention of sap-sucking insects such as the Aphids which find the fresh growth of young plants highly nutritional and consequently represent a significant threat to successful cultivation. The behavioural influence of colour on insects has been investigated but the choice of colour to be used for the cover sheet will be determined by local factors in the chosen cultivation site none the least of which is the anticipated population of insect pests.

A preferred group of colours includes yellow to deter aphids from plants and black or other dark colours for birds and weeds.

Preferably the carrier sheet acts as a barrier to photosynthesis by being completely opaque or only selectively light transmissive, i.e. absorbing or reflecting those wavelengths which will promote growth of plants classed as weeds or at least represent undesirable competition to the plants to be cultivated.

User preference may also be a factor in choice of coloration and this may be for cosmetic or aesthetic preferences in order to match, blend in with or deliberately contrast with objects in the immediate vicinity of the invention in situ.

A variety of materials can be adopted to achieve the objectives of the invention. However the invention has been tested successfully using a variety of polyurethane materials for both carrier and cover sheets. Paper has also been found useful in making satisfactory products.

According to yet another aspect of the present invention there is provided an apparatus for production of a seed-containing growth medium comprising means for supporting a carrier sheet, means for applying a seed to a predetermined location upon a supported carrier sheet, means for applying a second sheet over the seed and superimposing the second sheet upon the carrier sheet, means for attaching the second sheet at selected discrete contact points with the carrier sheet to thereby define a plurality of non-circular containment zones between the sheets, at least a selected number of said zones containing a seed, wherein the means for attaching the second sheet at selected discrete contact points with the carrier sheet comprises a probe having a heated contact surface the configuration of which enables application of heat to the sheets around a seed without impacting the seed.

Generally each non circular containment zone will contain only a single seed as presently defined for our purposes but it in certain circumstances it may be advantageous to place more than one seed in each containment zone. This may be relevant with very small seeds or where previous tests or knowledge indicate that a significant proportion of a seed lot may not be likely to germinate properly or perhaps more simply with species like coriander where spherical fruits that contain two seeds per fruit are more convenient to handle whole than be split in to pieces containing only one seed.

It is preferred that the containment zone thereby defined is non-circular because it has been observed that some seeds after germination simply coil in the plane of the superimposed sheets (and may quickly run out of the resources to emerge at all) rather than grow out of the plane of the sheets. A preferred configuration for the probe heated surface is an elliptical tip. An elliptical tip which is non-circular discourages such coiled growth. Use of Non-circular Containment zones so formed by non-circular tips will function to discourage such coiled growth and encourage penetration of the shoot through the cover layer by means of the provision of internal corners or at least tighter internal curves than are provided by circular containment zones. Thus when a growing plant shoot contacts a corner or a tight curve in such a non-circular containment zone and is obliged to change direction to continue growing, the required change of growing direction angle is likely to be less for the plant shoot to penetrate the cover layer than for the shoot to turn close to 180° around and grow back towards its origin. Therefore with seeds of species that are likely to coil within any type of containment zone, provision of non-circular zones is likely to result in an increased proportion of seeds being able to produce shoots that can successfully penetrate the cover layer.

Preferably the first and second sheet materials themselves are heat sensitive, e.g. thermoplastic with the ability to develop tackiness or sufficient interaction in a thermoplastic state to provide adhesion or bonding therebetween in a subsequently cooled state. However it is also possible to apply a heat activated bonding agent to one or other or both of the carrier and second sheets to permit use of biodegradable materials other than thermoplastics.

Where as a matter of preference the growth medium is required to exhibit superabsorbency to encourage root formation, and the carrier sheet itself does not incorporate a superabsorbent material within it then the apparatus is provided with application means for depositing a predetermined amount of superabsorbent material in zones adjacent seed zones.

Preferably the apparatus is provided with zone discriminating means controlling the respective application means whereby the discrete zones automatically and selectively have a seed or superabsorbent material deposited therein.

According to a still further aspect of the present invention there is provided a process for the production of a seed-containing growth medium comprising the steps of supporting a carrier sheet, applying a seed to a predetermined location upon the carrier sheet, applying a second sheet over the seed and superimposing the second sheet upon the carrier sheet, attaching the second sheet at selected discrete contact points with the carrier sheet to thereby define a plurality of non circular containment zones between the sheets, at least a selected number of said zones containing a seed, wherein the method of attaching the second sheet at selected discrete contact points with the carrier sheet comprises applying to the sheets a probe having a heated contact surface the configuration of which enables application of heat around a seed without impacting the seed.

According to one preferred embodiment, a reel of seed-containing growth medium is formed continuously by feeding the respective carrier and second sheets together in a juxtaposed position and shortly before said sheets are brought together introducing a seed, optionally with additives such as superabsorbent materials or growth aids therebetween, applying heat by surface contact with a heated surface at selected contact points, to entrap the seed and optional additives in a predetermined position by attaching the carrier and second sheets to one another, and reeling the so formed growth medium.

According to another preferred embodiment a stack of sheets of seed-containing growth medium is formed continually by feeding successive sheets of mutually corresponding size of the respective carrier and second sheets to a heat sealing apparatus for bonding together in a juxtaposed position and at a stage before said sheets are bonded together introducing a seed, optionally with additives such as superabsorbent materials or growth aids to a selected position to lie between the second and carrier sheets, applying heat by surface contact with a heated surface at selected contact points, to entrap the seed and optional additives in a predetermined position by attaching the carrier and second sheets to one another, and stacking the so formed growth medium.

An alternative to the addition of growth aids and/or superabsorbant materials as described above would be prior dipping and drying of one or both of the second sheets in aqueous solutions containing appropriate concentrations of the desired additives.

The desirable physical characteristics of the second sheet are described here and the tests and definitions used to derive these values are shown later. Many of these values come from tests done on blocks rather than the peeled layers used in this invention.

Preferably at least the cover sheet is of foam with a physical melting point of generally in the range 140° C.–270° C. and advantageously 250° C.

Preferably at least the cover sheet is of foam with a tensile strength in the range 25–55 kPa but advantageously 36 kPa.

Preferably also at least the cover sheet is of foam with an elongation of generally 40%–300% but preferably in the range 100%–250% and advantageously 172%.

Advantageously at least the foam of the cover sheet has a density of at least 35–65 kg/m$^3$ but more preferably 50.9 kg/m$^3$.

Advantageously at least the foam of the cover sheet is an open celled matrix preferably consisting of 30–75 cells per linear inch (CPI) (per 25 mm) but more preferably 63 CPI (or per 25 mm).

Preferably at least the cover sheet is of foam with a 40% compression load deflection hardness (CLD) in the range 1.2–2.1 kPa but advantageously 1.6 kPa.

Preferably also at least the cover sheet is of foam with a water droplet absorption time of generally less than 60 seconds but preferably in the range 1–15 seconds and advantageously at four seconds.

Preferably also at least the cover sheet is of foam with a complete upper surface wetting time of generally less than 2 hours but preferably in the range 1–50 minutes and advantageously at twenty minutes.

Furthermore, at least the cover sheet has a tear strength in the range of 1 to 10 Newtons per 25 mm but ideally 3.6 Newtons per 25 mm.

A suitable foam is obtained if during manufacture the water content is controlled in the range 2 to 6 parts by weight but preferably 3.8 parts by weight.

The invention will now be more particularly described by way of the following illustrative examples.

A seed germination system is provided which has a base or carrier sheet of foam or other fibrous material which is drawn from a reel located adjacent to an accurate seed placement device.

The selected foam is a polyurethane (PU) which is made by reacting toluene diisocyanate (TDI) with a polyol/ester resin (here glycol adipate) together. Using stoichiometric principles the theoretical perfect mix is given an "index" of 100° or % based on the relative proportion of TDI. The amounts are variable above and below that limit. In the present examples the foam had an index of 45%. A low index foam like this has fewer cross-links and the unreacted hydroxyl sites remaining on the resin impart a certain degree of hydrophilic properties. The reaction produces PU that becomes foam due to the by-products of $CO_2$ gas plus water that permit gelling or foaming all the time. The process takes a few minutes. There are also catalysts involved in small amounts, some of which evaporate off afterwards while others remain in the foam matrix. The foam is a convenient material but there is no need for the purposes of the invention that the material be a foam, only that it permits a certain degree of permeability for water.

The selected PU foam was made up of the following ingredients:

100 parts by weight of resin 23 parts by weight of TDI 3.8 parts by weight of water 0.45 parts by weight of N-ethyl Morpholine (NEM)

1 part by weight of silicone based surfactant (polyether modified polymethyl siloxane, e.g. SE 232 by OSI)

0.5 parts by weight CPE (trade name for amine catalyst blend plus wetting agents & emulsifiers)

0.015 parts by weight of organo-tin

It should be emphasised that the proportion of water which controls the chemistry of properties of the foam can be readily modified by adjusting the foam product by affecting the amount of $CO_2$ produced and this in turn will significantly affect the resultant foams physical properties. The range of water which can be added without destroying the foam's physical properties required is 2–6 parts by weight with the most preferred amount being 3.8 parts by weight.

The degree of biodegradation can also be influenced, principally by adjusting the amount of silicone surfactant used in the manufacturing process.

The foam has an elongation of between 40%–300% preferably in the range 100%–250% but generally has an elongation of about 172% which makes it suitable as a cover sheet. A tougher version of this foam e.g. more highly cross-linked may be used as the corresponding carrier sheet. It should be noted that the tensile strength of the foam is in the range 25–55 kPa and generally is 36 kPa. The density of the foam is in the range 35 to 65 $Kg/m^3$ but in this particular embodiment is 50.9 $Kg/m^3$. It should be noted that the tear strength is in a range of 1 to 10 Newton per 25 mm but ideally at 3.6 Newtons per 25 mm. The foam is in the form of an open cell matrix preferably consisting of 30 to 75 cells per inch (or per 25 mm) and ideally with 63 cells per inch. It should be noted that in general, the smaller the seeds concerned the more cells per inch are desirable and vice versa. It should be noted that if the foam is laid flat it will completely absorb a 0.5 mm drop of water gently placed on top of the foam within a period of 1 to 15 seconds but again ideally within less than 4 seconds.

Preferably at least the cover sheet is of PU foam with a physical melting point preferably in the range 140° C.–270° C. and advantageously at 250° C. However, for our purposes total liquefaction is undesirable, all that is required is softening into a "tacky" state that bonds adequately when cooled back to ambient temperatures again. This softening process happens progressively above 140° C. and it would appear that the optimal softening temperature range for sealing purposes is just under 230° C.

Laboratory techniques are available to measure the physical strength of developing plant shoots, even at early seedling stages and in the normal situation of having no overhead physical restriction to such growth. Acquiring such data can aid the determination of suitability of shoots when placed into a foam based media as described for this invention for emergence by rupturing the cover sheet. Alternatively the foam characteristics can be adjusted by altering the foam thickness or chemistry to get a proper match of foam resistance to the particular shoot. Where 0.75 mm foam thickness is cited, this is a reference to the distance the cutting blade is set above the block. As the peeled foam is stretched slightly as it is pulled away and rolled up, it's measured thickness is likely to be thinner than its blade spacing would indicate. The minimum possible blade spacing is 0.5 mm, thus the foam could perhaps be measured as thin as 0.25 mm.

It does not really matter to which sheet the seed is applied but for mechanical processing reasons it is preferred to operate the process using the tougher carrier sheet as the starting base sheet to which the seed, optional additives and cover sheet are applied during the process.

A suitable seed placement device is a pneumatic actuation device with perhaps a range of from 1–1,000,000 or so hollow needles attached. The device works in conjunction with a vacuum or aspiration device located on the reverse of the sheet to which the seed is to be applied e.g. located under the carrier sheet to provide a mechanical motion system whereby the seeds are picked up from a seed reservoir placed in the vicinity of the foam layer by dipping the needle into the reservoir and by means of the aspiration device the seeds are moved out of the reservoir to a position directly above a target spot on the carrier sheet where the device releases the seed by cancellation of the vacuum pressure and if necessary by further application of positive air pressure. The then empty needle(s) and placement device returns to the seeds reservoir to repeat the cycle. The range of speed is 1 cycle per second to 1 cycle per minute.

The needles can be placed in a line to second the width of the sheet and spaced at predetermined desired positions in a row formation. The needles may also be placed in a lattice formation of two or more lines in a substantially rectangular or block formation.

There is no seed spacing specification for a single seed placement only size dimensions for a piece of foam. However, for two seeds there would be a one dimensional spacing definition plus foam size dimensions. For three there could be a linear or triangular spacing definition. For four or more seeds a rectangular lattice arrangement would be normal but there are many alternatives including triangular lattices, pentagonal lattices, hexagonal lattices, etc. Any polygonal or irregular lattice could be used and the shapes and patterns can be joined or concentric.

The seed rows widths vary from about 1 mm up to 15 meters depending on the species of seed and the application. The within row spacings also vary from 1 mm to 15 meters. Plants normally grown to maturity at wide spacings may be sown in the foam close together and at later date can be moved and separated. In order to facilitate such removal the foam may be perforated to allow it to be separated by tearing it.

In cases where precision of seed placement and spacing is highly critical or the seeds tend to roll on a moving foam, a stationary cut lower sheet is preferred with the seed sowing device and upper sheet placement device moving directly above the lower stationary sheet to allow firstly the seed and then the upper layer to lie in juxtaposition with the lower sheet. Here the carrier sheet is cut in to the desired shape preferably rectangular from a minimum of around 2 cm by 2 cm for a single sheet to a probable maximum size limit of around 100 meters by 200 meters. The said sheet is placed either manually or mechanically onto a plinth that is predesigned to hold the sheet firmly and precisely in place. A seed placement device as already described is used to place the seeds on the carrier sheet. The seed may additionally be held on the carrier sheet by pneumatic vacuum suction from below the plinth.

Once the seeds have been placed on the carrier sheet and the seed placement device is retracted or the plinth is moved or both then a further foam sheet is placed above the carrier in juxtaposition to it and then lowered precisely on top of it. The upper and lower sheets are then sealed together by hot probes which are generally non circular. They can be elliptical or any other non circular shape such as square, diamond-shaped, provided that they do not impact the seed and provide sufficient bonding contact between the carrier and cover sheets) and made of metal which contact and press the two sheets together against the plinth. The rings contact the foam for about 1 second at a temperature of 190° C.–270° C. but preferably at 230° C. The sealing ring is positioned in such a way as to surround the seed particles lying between the layers of foam thereby entrapping and sealing the seeds into a pocket. If the probe tip temperature is below 190° C. it is too cool to seal properly and if above 270° C. then there is an increased risk of burning holes through one or both layers of foam resulting in improperly sealed cavities unless the duration of contact is made very short.

The same temperature data can be applied to sealing the edges of the foam layers together but here a slightly longer duration and/or use of hotter wire is beneficial to ensure that the layers both seal together and cut cleanly. The edge is farther away from the location of the seeds, so there is less danger of killing seeds with excessive heat while sealing the edges together.

The dimensions of the ring probe outline are related to the size of the seed species or seed lot present. The width of the outline metallic part of the ring probe that makes contact with the sheets to bond them will be normally be approximately one mm wide to achieve adequate strength of bonding but could be narrower for dense sowings of small seeds or wider for sparser sowings of large seeds. However, in all situations it is not desirable for the outline to contact the seed or seed coat directly as this would kill the seed and too large a chasm would enable the seed to move around too much before germination causing the shoot or root after germination to grow within the capsule before penetrating the upper foam layer. If such lateral expansion of the root or shoot occurs before the said shoot attempts to break through the upper layer then it may be impossible for it to emerge through the foam layer.

As a rule of thumb a spacing of about 10–25%, but preferably 10–15% of the longest dimension of the seed is preferred around the seed.

In addition to sealing seeds in individual pockets the edge of the upper and lower sheets are trimmed with a cutting wire and sealed together leaving a smooth edge. The edge sealing and cutting wire temperature is in the range of 260°0 C.–420° C. and preferably 320° C. and the heat source is held in contact with the edge for about 1–5 seconds.

The upper layer is formulated in terms of elasticity and tensile strength to permit penetration by young seedlings of broadleafed species and both upper and lower layers are hydrophilic enough to reduce the evaporative influence of hot weather periods. The foam is of a polyurethane base with soil conditioning polymers as additives including polyacrylamides.

The sheets or rolls produced can be supplied as above or incorporated with other components of a seed germination kit.

In an alternative embodiment the vacuum device may be replaced by an electrostatic device particularly in the case where small seeds are being handled and may be damaged by a vacuum device. The needles used with this device can use positive or negative charges to pick up or drop the seeds.

In use the joint function of the two layers of foamed plastics material when sealed together with dry seeds entrapped between them is to protect, transport and accurately place out the lattice layout of seeds and maintain same in position thereafter. The joint function of the two layers when the product is initially put in situ is to allow the seeds to soak up adequate water for germination without restricting access of oxygen and prevent seeds from falling down into any fissures that may exist in any growing media below the foam. However, once germination has taken place, the function of upper layer alone is to allow the emerging plant shoots to break through upwards and receive incoming natural or artificial, light whilst still holding and supporting the lower parts of the seedlings in situ. The function of the lower layer is to support root growth and supply water and nutrition until the plant(s) grow(s) down into soil or another growing medium beneath the foam medium layer or the plant(s) grown in the foam is/are physically transferred to another site that is suitable to support conventional plant growth either with or without physical removal of the foam from around the plant.

The processing steps and apparatus of the invention will now be further described by way of example with reference to the accompanying drawings in which:

FIG. 1 is a schematic illustration of a continuous manufacturing process for obtaining a reel of seed-containing growth medium: and FIG. 2 is a schematic illustration of a manufacturing process which may be operated continually for obtaining a plurality of discrete sheets of seed-containing growth medium which may be stacked or bundled for packaging if desired.

In the first figure (FIG. 1) there is shown an apparatus for assembling a continuous seed-containing growth medium according to one aspect of the present invention. In the illustration shown, a base layer (1) of the medium is stored on a roller (11) of sufficient dimensions for the width of material handled, from which it is fed, through a series of tensioning and guide rollers (12, 13) to an indexing roller (14) where seeds are deposited onto the base layer sheet. The position of the tensioning roller (12) can be adjusted vertically as shown by the arrow in the drawing to apply more or less tension to the lower sheet as it is drawn from the storage reel.

A second storage reel (15) is loaded with the top layer (2) of the sheet which is also fed through a tensioning roller (16) and guide rollers (17, 18) to the indexing roller. The upper sheet is fed onto the indexing roller at a position adjacent to seed depositing means (19) so that the upper sheet is applied over the lower sheet. As above, the tensioning roller (16) can be moved vertically as shown by the arrow to vary the tension applied to the upper sheet as is drawn from the storage roller.

The seed depositing means is located above the indexing roller. The interior of the indexing roller is evacuated to form a vacuum cavity and the surface of the indexing roller is provided with a matrix of radial holes which are in communication with the cavity.

Seeds are stored in a trough (19a) adjacent to the seed depositing means and are mechanically selected by a pneumatically (or electrostatically) operated placement system, transported to a position above the lower sheet and placed on the lower sheet. Each seed is placed on the sheet above one of the radial holes in the indexing roller. The lower sheet, with the seeds placed thereon is then transported around the indexing roller as shown in FIG. 1.

As the interior of the indexing roller is evacuated, the seeds are held in position within the radial holes by the vacuum as the lower sheet is transported around the indexing roller.

The upper sheet is fed onto the indexing roller, above the lower sheet and the seeds placed thereon. The upper and lower sheets are welded together around the seeds by a heat welding apparatus such as the hot tip of a heated rod (3). A matrix of such rods may be provided to match the distribution of the seeds on the lower sheet. However, the weld forms a seal around the seeds with sufficient clearance as to ensure that the seed viability is not degraded by the heat treatment.

The heated rod is provided with an adjustable temperature control (not shown) as the seed foam combinations may require different temperature settings or bonding times than others. It is envisaged that the operating temperature of the heated rod will commonly be in the range of between 250° C. to 350° C. although higher temperatures are contemplated for shorter time periods in the interest of increasing production.

The welded sheet is then passed between the seeding roller and a rubber faced nip roller (8) to ensure reliable driving of the sheets around the indexing roller. The welded sheet is then fed around a guide roller (9) to a wind up storage roller (10). The sheet stored on the roller can then be cut to any required length.

In an alternative embodiment of the present invention, referring now to FIG. 2 (FIG. 2) which shows an apparatus for assembling a seed sheet. The apparatus comprises a rotatable platen (20) on which a work station is defined by a series of holes in the surface of the platen. A vacuum source is located below the platen and the holes in the upper surface of the platen are in communication with the vacuum source. The upper surface of the platen is faced with a thin layer of silicone rubber, the purpose of which will be described in more detail below.

Transfer means (21) are provided for transferring pre-cut lower sheets from a storage stack (22) placed adjacent the platen to the surface of the platen over the work station. The transfer means may be in the form of a combination of operator hands free and operator foot pedal control.

A seeding device (23) is located approximately 90° from the transferring machine, adjacent to the platen. The seeds are located in a matrix of hoppers (24) spaced to match the final required seed layout pattern on the surface of the lower sheets. A pneumatically operated placement system (25) is located on the seeding device to transfer seeds from the hoppers to the platen. The placement system may be in the form of a plurality of vacuum needles which can be moved between the hoppers and the platen to pick up seeds by aspiration and then deposit them in the required position.

An upper sheet placement device (26) is located diametrically opposite the transfer device. The placement device comprises a feed roll (27) for storage of the upper sheet, cutter means (28) for cutting the upper sheet to the required size and set down means (29) for placing the upper sheet over the lower sheet on the work station.

Finally, a heating device (30) is located diametrically opposite the seeding device. The heating device comprises a heated tool which can be selectively brought into contact with the upper sheet.

An indexing mechanism is provided to ensure correct positioning of the platen at each of the devices described above.

The operation of the apparatus will now be described. A lower sheet is transferred from the sheet storage stack to the work station on the platen by the transfer machine. The sheet is held in place over the work station by the application of the vacuum within the platen. After the lower sheet is correctly registered on the work station, the platen rotates about 90° so that the lower sheet is located adjacent the seed depositing device.

Individual seeds are picked up by vacuum needles are transported to the platen where the vacuum in the needle is switched off thereby releasing the seed from the needle and placing the seed on the lower sheet. The seed is held in position on the lower sheet by the vacuum suction through the holes in the work station.

The platen is then rotated through a further 90° to the upper sheet locating device. The upper sheet is of a more delicate nature than the lower sheet and therefore, the upper sheet is automatically fed and transferred to the assembly on demand. The upper sheet is cut to length and placed over the lower sheet and seeds on the work station. The vacuum applied through the holes in the work station serves to retain the upper sheet in position over the lower sheet and seeds as the plated is rotated.

After a further rotation of 90° the work station is located adjacent to the heating device. As the heating device is brought into contact with the sheets a weld is made around the seeds to encapsulate the seeds within a pocket between the upper and lower sheets. The weld is sufficiently clear of the seeds so as to ensure that the performance of the seeds is not degraded by heat. The pressure with which the heating tool contacts the sheets can be adjusted in order to ensure that the sheets are not pierced by the heating tool.

As described above, the upper surface of the platen is provided with a layer of silicone rubber which acts to minimise the risk of piercing the sheets with the heated tools and also minimises heat loss through the platen.

It is envisaged that the heating tool will generally have an elliptical shape as this will encourage the plant shoot produced from the seed to pierce the upper sheet when it starts to grow. If a circular seal is made around the seed, the seed may grow within the pocket in the sheets without piercing the upper sheet and leading to stunted growth of the seed.

Following encapsulation of the seed, the platen is rotated by a further 90° to place the completed sheet adjacent the transfer device. The sheet is lifted from the work station and transferred to an adjacent conveyor (31) for further processing such as printing and packaging.

LABORATORY TEST RESULTS

Tests were carried out in controlled environment growth chambers on numerous species comparing germination and cover layer penetration of seeds sealed in between two layers of PU foams with standard germination tests of ordinary free seeds. Results are shown in Table One for three dicotyledonous species. Under such laboratory conditions, seeds germinated in the "low index" PU foam specification of the present invention can produce germination and penetration results comparable with the germination-only performance of non-encapsulated seeds and may actually be able to slightly enhance the performance of such seeds in species like tomato.

All three of the quoted species show a substantial improvement in penetration performance when directly compared with foams similar to those available for U.S. Pat. No. 4,309,844 and GB 1 601 557. This observation was demonstrated most dramatically with cucumber but nevertheless an improved performance trend was also noticed with most other tested but non-quoted dicotyledonous or monocotyledonous species except for grass species that were able to penetrate either foam specification equally well.

top. Instructions may be placed inside or supplied as part of the boxing/wrapping.

Such a kit requires minimal maintenance other than watering and it will allow plants to grow to a usable size in situ, if placed on an ordinary domestic kitchen window shelf, where the only external additives are already nearby: e.g. water from the tap, light as sunlight from the window or in artificial form from lamps and heat from the cooker.

Suitable organic species for inclusion in such a kit would be Parsley, Coriander, Basil, Chives and such like. The dimensions of the sheet and kit plus the seed number and spacing will be largely be determined by the requirements of the particular user's needs but the longest single dimension will probably be less than 30–40 cm in all cases. Additionally it may be preferred by users to have kits with more than one species or variety within that species included in a single sheet or alternatively a single type of seed per sheet but have a selection of sheets available as part of the kit.

EXAMPLE 2

The invention may also be used in card inserts. Greeting cards for special occasions, e.g. Valentine's day, Mother's day, Easter and birthdays, etc. could have a flat "seed in foam" sheet added as a token of one's appreciation to a loved recipient. Therefore "seed in foam" seed sheets could be made with a range of suitable flower species and cut to represent feelings or events, e.g. shapes like "Hearts", "Easter Bunnies/Chicks", "Shamrocks". The dimensions of the sheet in this case will probably be restricted by the size of the card unless folding is permissible.

EXAMPLE 3

The present invention can be used to produce slightly larger scale products such as grass "seed in foam" rolls or wild flower "seed in foam" rolls or vegetable "seed in foam" rolls wherein the mixture of seeds is placed between the top and bottom layer of foam. Cultivated garden theme mixtures are also possible; e.g. a fragrant mixture; a butterfly friendly

TABLE ONE results of foam germination & penetration vs. standard germination tests for three species

| Species | Standard Germination Test of non encapsulated seeds on sand | Germination and cover layer penetration test in PU foam similar to that available in GB 1 601 557 | Germination and cover layer penetration test in "low index" PU foam of the present invention |
| --- | --- | --- | --- |
| Cornflower | 98% | 66% | 88% |
| Cucumber | 90% | 5% | 93% |
| Tomato | 92% | 69% | 96% |

Uses of the seed germination system of the present invention are described in the examples below.

EXAMPLE 1

The seed-containing growth medium can be used in so-called "Just Add Water" herb kits where a tray and preferably transparent lid are supplied along with fine compost with added fertiliser, a sheet of the seed in foam of the present invention which is cut to the size of the tray, a small tube to facilitate watering and some vermiculite or other material as a topping layer. The kit is assembled by placing the compost in a level layer in the tray bottom, laying the sheet followed by the topping on top of the compost, putting the small tube vertically in a corner and sealing the lid on mixture as are random, regular or pre-designed floral patterns (e.g. an arrangement including variously coloured flowers and/or other plants or parts thereof that may represent a familiar pattern such as a famous painting, an advertisement, a direction sign or another form of functional or aesthetically pleasing design, when viewed from a respectable distance; or just simple separate zones of annual or perennial species. The marketable dimensions and formats could include but are not restricted to rolls up to several meters long or foldable mats approximately one and a half meters square. Formats could additionally include "postage stamp" perforated zones of weakness to facilitate simple tearing to allow the product to be accurately shaped for the selected area or a strengthening net, mesh or template attached onto one or between the two layers to facilitate a stronger product capable of being handled less gently and yet maintain its integrity.

"Seed in foam" rolls have some additional advantages over fibre based competing mats. Foam rolls have better water retention. When being cut into shapes or simply folded or unfolded, dust particles are not liberated to cause nasal irritation to users or make a mess. For a given area of coverage, foam rolls are also likely to take up less space when rolled up in store or in transit than fibre mats.

EXAMPLE 4

A further example of the present invention would be where a manufactured sheet similar to "Example 1" or "2" is cut out into separate single pockets with minimal amounts of foam attached externally to the zone of sealing. Such an example would sacrifice many of the described advantages of handling and controlled spacing provided by mat formats but nevertheless could directly compete against pelleting of seeds, especially where hard pelleting materials like clay or cork prove to be too tough barriers for smaller and weaker seeds to successfully germinate through, whilst still providing the proximity of "growth aids" and ease of handling as hard pelleting materials are able to provide. It would also be possible to provide more than one seed per pocket just as pellets may contain more than one seed of species such as Lobelia.

EXAMPLE 5

A single seed row product that also contains parallel rows of appropriate "growth aids" positioned at appropriate distances from the seed that are intended in this case for use with vertical sowing of the product into natural soils preferably by mechanical device whereby the growth aids will function only when the seed has germinated and produced roots that grow down into the zone of placement facilitated by the vertical sowing of the product with the row of "growth aids" material positioned directly below the row of seeds. Advantages of using this particular format will include time and cost saving through combining several jobs into one pass and a reduced environmental exposure risk through reducing the total quantities of growth aids required through accurate placement in the optimal zone for the plant to assimilate.

EXAMPLE 6

Very long single or multiple row versions of "Example 3" formulated specifically for commercial scale direct sowing applications perhaps assisted by suitably designed sowing machinery for situations such as seeds for field scale vegetable production, seeds intended for further seed multiplication or breeding purposes, e.g. where F1 hybrids require distinct lines of parental plants to be grown in proximity or for convenience where experimental selections are being laid out at the early stages of plant breeding programmes.

EXAMPLE 7

In all the other examples described above, the PU formulation as described for the present invention is cut into layers and requires mechanical placement of seeds and cover sheets and a sealing/entrapment device is also necessary to complete the process of making the product. Alternative methods of utilising this PU formulation for use with the process of the germination of seeds would be systems of applications that involve applying the foam to seeds after mixing the reagents together but before complete solidification of the PU foam has occurred. Such methods could include pouring the foam over random or precision placed seeds of a stationary flat surface. The liquid foam could actually be used as a form of pelleting material if poured into moulds containing single seeds. Still other alternative methods may involve mixing seeds with the foam reagents prior even to pouring out the foam. After formation such seed containing foam blocks so formed in these alternative ways could be trimmed to control the thickness of foam covering seeds or cut in to layers or special shapes, etc.

EXAMPLE 8

Still further alternatives methods of utilising the PU foam of the present invention that involve neither sealing seeds between thin layers nor mixing during liquid manufacturing include placement of seeds into holes drilled or punched into the top of solid blocks of the PU foam formulation. The seeds so inserted should be a fairly tight fit in the hole to minimise risk of subsequent loosening out of such holes but not so tight or deep as to restrict shoot emergence. Similarly the distance between the bottom of the hole, i.e. where the seed will rest and the bottom of the block should not be too thick to preclude downwards penetration by radicle and/or roots produced from the seeds.

A device similar to a small medical syringe utilising a moving plunger working inside a hollow needle with a slanted opening at its tip to facilitate better penetration of the foam can be used to punch the hole in the block and then immediately deposit the seed and withdraw leaving said seed correctly positioned in said block of PU foam.

EXAMPLE 9

A product similar to any of the two layered examples above, whereby a third layer of PU foam suitably cut into holes that match the intended sites for the containment zones is incorporated between the cover and lower sheets in the same plane as the seeds are, thus facilitating deeper more cylindrical shaped containment zones in the product. This application may be advantageous where large seeds may "bulge" in a two layer format that may be difficult to stack or more prone to damage when handled. Such a third layer could also function as a sterile or controlled water release/humidity reserve for tasks such as transporting pregerminated seeds.

EXAMPLE 10

Seeds so encapsulated in foam utilising this invention also offer advantages in certain medialess cultivation systems when used for commercial, hobby and plant root research purposes.

The foam sheets containing the seeds could be suitably fashioned and placed in most of the commonly available Hydroponics cultivation systems including those utilising nutrient film techniques. The foam sheets could be allowed germinate in one location and later be translocated into larger growing vessels or directly placed into a vessel large enough to support the fully grown plant. However, there are several specific instances where foam encapsulated seeds from this invention can provide advantages over loose seeds or paper/fibre entrapped seeds. For instance loose materials such as peat, composts even vermiculite, etc. that are capable of having seeds placed in them and/or covering said seeds can be undesirable in hydroponics systems where water moves through because they can break off particles that can clog filters, pipes and pumps, etc. Consequently, inert and more solid but porous materials are preferred, e.g. cooled Rockwool fibres spun from superheated molten rocks formulated with a binder into products such as the "Grodan Rockwool" cubes/slabs and also similar organic materials such as coconut fibres. These formulations of materials are less prone to breaking off particles but equally instead they are less well suited to holding seeds and young seedlings because young plants could be washed away by moving water.

With the existing systems, potentially there is therefore a conflict of choice between either being able to cover seeds properly along with the risk of clogging the system or not being able to cover the seeds properly with no risk of clogging. The foam used in conjunction with Rockwool can therefore provide the best of both worlds—adequately covered seeds that are held when they become seedlings and no system clogging.

In aeroponic seed germination and cultivation systems utilising "ebb and flood" techniques that alternate irrigation and nutrient supply with good aeration thus providing near optimal access to raw chemical inputs to all parts of plants that are normally underground. By definition water has to be vertically as well as horizontally mobile in these systems whatever type of rooting media is used. When water moves within such systems particularly during germination and the early stages of seedling growth, there may be danger of dislodgement and/ or physical damage to plants produced from loose seeds or seeds originally entrapped in paper/fibre because such plants are too immature to have anchored themselves properly in the media. This is because loose seeds are unprotected and paper/fibre becomes physically much weaker when wetted, possibly even disintegrating rapidly thus negating the protection benefit from encapsulation material and possibly allowing water soluble glue leaching to occur in the flow system.

Seed so placed in the foam sheets with or without attachment to or presence of other rooting media, e.g. Rockwool, are thus offered protection when wet and this protection could even be enhanced by anchoring sheets to adjacent solid objects (preferably by a heat sealing technique) thus facilitating protection against greater flows if required.

In other forms of aeroponic seed germination and cultivation systems utilising techniques involving spray blown vapour saturated mists of nutrients, foam sheets containing seeds could be raised up and positionally suspended into the zone of misting by end attachment. The zone of misting may be restricted by containment to the space immediately below the sheet where the seedling roots will grow down into the zone of misting, or could be allowed to exist above and below the sheet. If the container is transparent, growth patterns can be observed for educational or research purposes or simply to be judged for readiness of transportation to a new location suitable for continued growth.

In an alternative embodiment, the function of the lower layer of foam to provide positional suspended support could be replaced with or supplemented by a block of a very much wider matrix PU foam preferably with fifteen or fewer cells per inch. (Such fairly rigid wide matrix foams are available for use primarily as air filters and also as loud speaker grills or as applicators.) As all components are made from PU an extension of the heat sealing technique could be used to adequately assemble them together. Fertility and hydrophilicity issues of the foam are not important for this support only application of the proper pH, humidity, concentration of additives and controls of the spray etc, will always ensure that then environment is right for the particular plant being grown.

Clearly plant roots would have no difficulty in penetrating down through such a wide matrix lower foam and nor would such a foam impede air, mist or nutrient access. The type of foam may also provide a degree of protection from damage during subsequent transportation operations.

Other than specifically for "Examples 4,7 or 8" as described above, the advantages of the present invention are that the seed germination system herein described allows the seeds placed in the form of a lattice on the upper surface of the lower sheet thereby enabling the lower sheet to be stationary thus preventing the seeds from rolling around after placement. Evenly spaced plants are therefore more likely to grow more uniformly. Seed numbers, sowing rates, weights used and plant populations so formed may thus be known accurately thereby avoiding excessive use of large amounts of seeds and subsequent expense or on the other hand avoiding the use of too few seeds whereby the desired plant stand is not achieved.

Furthermore the growing performance is easier to access if all plants have an equal spatial opportunity to grow into. Moreover precision sowing techniques can lead to economic advantages and benefits from having more uniform samples of plants so produced.

The sealing of the upper and lower sheets as well as providing individual sealed pockets prevents seeds from escaping from within an internal ring or any which miss being sealed completely will not be lost totally and other seeds cannot enter the bilaminate unintentionally.

Tests and definitions of several physical attributes of PU foam are shown here. NB all these tests are done on foam blocks. These blocks would require peeling into layers 0.75 (±0.5) mm thickness for use with germinating seeds as described elsewhere.

Density: Guideline Procedure: BS4443: Part 1: 1988, Method 2.

Procedure: A sample block of size 390 mm (±10 mm)× 390 mm (±10 mm)×50 (±2 mm) is prepared.

Sample is weighed in grammes to one decimal place. The thickness is checked (in mm) as a mean of four readings using a soft contact micrometer and is quoted to 2 decimal places. The area is calculated from a mean of three measurements in each direction with a calibrated ruler. Volumes are calculated appropriately for "cylindrical" blocks and for "square" blocks.

Calculation and replication: mean of 3 samples.

$$\text{Density in kg/m}^3 = \frac{1000 \times \text{mass in grammes}}{\text{Volume in cm}^3}$$

Working Range: Midpoint 50.9 kg/m$^3$, range 35 to 65 kg/m$^3$

Elongation at Point of Breakage: Guideline Procedure: BS4443: Part 1: 1988, Method 3A Procedure: A "Zwick" stamper is used to cut out a "Dumb-bell" shaped strip from a piece of foam of previously measured thickness. The sample is placed in the jaws of a "Testometric Micro 350/132" machine. The extensometer jaws are clipped on using the lightest possible pressure. The Extension readout is set to zero then the "Strain" button on the Crosshead Control is pushed. The machine extends the sample at a rate of 500 (±50) mm per minute. When the sample breaks the Extension is read.

Calculation and replication: mean of 3 samples. Elongation percentage is Extension at break×4.

Definition: Elongation at break is defined as the additional length of the material under stretch at point of breakage. So that a value of 100% means that at point of breakage the total length has doubled that of the original length, and similarly 200% means that the total length has trebled. Values much less than 100% are possible with very brittle and rigid foams as are elastic ones of 600% plus.

Working Range: Midpoint 172%, range 80% to 300%
Cell Count Per Inch: Guideline Procedure: BS4443: Part 1: 1988, Method 4.

Procedure: A rectangular block of 100 mm×100 mm×50 mm dimensions is cut with the large face perpendicular to the rise of the foam. A felt tipped marker of a contrasting colour to the foam is drawn lightly across the surface to enhance the cut edges of the cells. The number of cells per linear 25 mm is counted with a "linen prover" (cell counting glass).

Calculation and replication: One sample only. Result reported as the cell count per 25 mm or it can be divided by 2.5 to give cell count per cm. The approximation of 25 mm=1 Imperial Inch can be used to directly express cell counts as cells per inch (CPI).

Working Range: Midpoint 63 CPI, range 30 to 75 CPI. In general, the smaller the seeds concerned are the more cells per inch are desirable and vice versa.

Tensile Strength: Guideline Procedure: BS4443: Part 1: 1988, Method 3A

Procedure: A "Zwick" stamper is used to cut out a "Dumb-bell" shaped strip from a piece of foam of previously measured thickness. The sample is placed in the jaws of a "Testometric Micro 350/132" machine. The extensometer jaws are clipped on using the lightest possible pressure. The Load readout is set to zero then the "Strain" button on the Crosshead Control is pushed. The machine extends the sample at a rate of 500 (±50) mm per minute. When the sample breaks the Load is read.

Calculation and replication: mean of 3 samples. Definition:

$$\text{Tensile strength (kPa)} = \frac{\text{Average Breaking Load (N)} \times 77}{\text{Thickness (mm)}}$$

Working range: Midpoint 36 kPa, range 25 to 55 kPa.
Tear Strength: Guideline Procedure: BS4443: Part 6 1988, Method 15

Procedure: Prepare rectangular samples 25 (±1) mm×25 (±1) mm×75 (±3) mm. Make a straight central horizontal cut 35 (±3) mm deep in the 25×25 mm side at 90 degrees to the direction of the "rise" of the cells.

Under ambient laboratory conditions, place the cut ends of the sample in the jaws of the "Testometric Micro 350/132" machine. Run machine at 50 mm per minute. Tear should be continued in the direction of the existing cut, using a blade if necessary to ensure the tear remains central. When the tear has travelled 25±5 mm, the maximum force reading in Newtons is recorded.

Calculation and replication: Mean of 3 samples. Definition: Expressed in units of Newtons per 25 mm.

Working range midpoint 3.6 Newtons per 25 mm, range 1 to 10 Newtons per 25 mm. 40% C.L.D. Hardness: Guideline Procedure: BS4443: Part 1: 1988, Method 5A Procedure: Prepare one sample 100 mm×100 mm×50 mm (nominally). Measure the actual area and thickness. Under ambient laboratory conditions, insert sample centrally between the indentometer compression plates of the "Testometric 350/227" machine. From the pre-determined thickness value, calculate a 70% and 40% reading. Enter the 70% value on the extension cycle as the upper limit and enter a lower limit of zero. Set the last cycle upper limit at the 40% value and the number of cycles to read four.

Set the indentometer to stop at the last cycle. Press the "down" button and on the fourth cycle press "peak hold" button and record the reading.

$$\text{Definition 40\% CLD Hardness (kPa)} = \frac{1000 \times \text{force (N)}}{\text{Area of Sample (mm}^2\text{)}}$$

Working range: Midpoint 1.6 kPa, range 1.2 to 2.1 kPa.
Alternative procedure using "Testometric 350/132" machine. Measure block as above and calculate 40% & 70% thickness values. Then insert centrally between indentometer compression plates.

Set 70% value on extension cycle gauge.
Set number of cycles at 3.
Set Load at 5N±1N.
Set cycles completed at zero
Set Extension to zero
Press "strain" and allow machine to indent sample 3 times. Immediately after third unloading press "peak hold", set extension gauge to zero and indent sample to 40% of original thickness and record force.

Hydrophilistity
Procedure: Tests of Hydrophilisity.
1) A droplet of water of volume 0.5 cm$^3$ at ambient temperature is placed on a foam sample using a syringe. Care is taken not to inject the water into the surface pores of the foam. The time is noted for complete absorption into the matrix.

Working range: Midpoint 4 seconds, range 1 to 15 seconds.

2) A 100 mm×75 mm×20 mm sample of foam is immersed in water at 20°C. and is squeezed 15 times. The sample is then removed, excess water squeezed out, and then placed on the surface of the water. The time is noted for the upper surface of the foam to become completely wet.

Working range: Midpoint 20 minutes, range 1 to 50 minutes.

We claim:

1. A seed-containing growth medium for promoting the growth of a root and a shoot from said seed comprising:
    a flexible carrier sheet, and a cover sheet, said cover sheet overlying the carrier sheet,
    wherein the physical characteristics of the sheets differ such that the carrier sheet has a higher water retentive capacity than the cover sheet, and the cover sheet is more easily penetrated than the carrier sheet,
    the said carrier sheet and cover sheet having attached parts at selected discrete contact points to provide a plurality of containment zones,
    said attached parts of the said carrier sheet and cover sheet delimiting the extent of said containment zones to configure said containment zones to define pockets for surrounding and entrapping at least one seed therein,
    the configuration of said pockets being such as to provide at least one of, internal corners and tight curves, when viewed normal to the plane of the medium,
    whereby lateral expansion of the root or shoot is inhibited and penetration of the said shoot through the cover sheet is encouraged.

2. A seed containing growth medium according to claim 1 wherein the emerging seedling can readily rupture the cover sheet whilst the root radicles of all types of species naturally progress into the carrier sheet and beyond to firstly form a primary root and then a secondary root structure.

3. A seed containing growth medium according to claim 1 wherein the carrier sheet incorporates an absorbent material.

4. A seed containing growth medium according to claim 1 wherein the carrier sheet incorporates a superabsorbent material.

5. A seed containing growth medium according to claim 1 wherein the carrier sheet is made from superabsorbent material.

6. A seed containing growth medium according to claim 4 wherein the superabsorbent material is additionally introduced to at least a proportion of the containment zones defined between the carrier and cover sheets.

7. A seed containing growth medium according to claim 5 wherein the superabsorbent material is additionally introduced to at least a proportion of the containment zones defined between the carrier and cover sheets.

8. A seed containing growth medium according to claim 4 wherein the superabsorbent material is only introduced to a proportion of zones defined between the carrier and cover sheets.

9. A seed containing growth medium according to claim 5 wherein the superabsorbent material is only introduced to a proportion of zones defined between the carrier and cover sheets.

10. A seed containing growth medium according to claim 3 wherein the absorbent material comprises at least one of clay, kaolin talc, calcium carbonate, sodium sulphate, sodium carbonate, and aluminium oxide.

11. A seed containing growth medium according to claim 4 wherein the super absorbent material comprises at least one of modified starch, cellulose, alginate, carboxy methyl cellulose and polyacrylic acid.

12. A seed containing growth medium according to claim 5 wherein the super absorbent material comprises at least one of modified starch, cellulose, alginate, carboxy methyl cellulose and polyacrylic acid.

13. A seed containing growth medium according to claim 6 wherein the super absorbent material comprises at least one of modified starch, cellulose, alginate, carboxy methyl cellulose and polyacrylic acid.

14. A seed containing growth medium according to claim 7 wherein the super absorbent material comprises at least one of modified starch, cellulose, alginate, carboxy methyl cellulose and polyacrylic acid.

15. A seed containing growth medium according to claim 8 wherein the super absorbent material comprises at least one of modified starch, cellulose, alginate, carboxy methyl cellulose and polyacrylic acid.

16. A seed containing growth medium according to claim 9 wherein the super absorbent material comprises at least one of modified starch, cellulose, alginate, carboxy methyl cellulose and polyacrylic acid.

17. A seed containing growth medium according to claim 1 wherein the carrier and cover sheets are formed from biodegradable materials wherein the degree of biodegradation is controlled to provide a durability commensurate with the predicted germination period of the seedlings whereby once the seeds have become established plantlets or immature plants, there is little residual evidence of the seeding mechanism to contaminate the environment.

18. A seed containing growth medium according to claim 17 wherein the sheets are of polymeric materials whose reactive components are adjusted initially such that gradual breakdown is a predictable eventuality.

19. A seed containing growth medium according to claim 17 wherein the sheets are of polymeric materials containing additives which will in the course of time disrupt the polymeric structure such that the degree of cross-linking of a polymer matrix is such that gradual breakdown is a predictable eventuality.

20. A seed containing growth medium according to claim 17, 18 or 19 wherein the controlled degradation of the carrier and cover sheets enables maximum protection for the seed during its vulnerable germination and establishment phases but minimum restriction to the maturing plant whose root system can freely expand into the soil in a natural way.

21. A seed containing growth medium according to claim 1 wherein the cover sheet is selectively coloured.

22. A seed containing growth medium according to claim 21 wherein the cover sheet is coloured yellow to repel aphids from the plants.

23. A seed containing growth medium according to claim 21 wherein the cover sheet is coloured black or other dark colours to repel birds and inhibit weeds.

24. A seed containing growth medium according to claim 21 wherein the cover sheet is coloured for cosmetic or aesthetic preferences in order to match, blend in with or deliberately contrast with objects in the immediate vicinity of the medium in situ.

25. A seed containing growth medium according to claim 1 wherein at least the carrier sheet acts as a barrier to photosynthesis by being selectively light transmissive, i.e. absorbing or reflecting those wavelengths which will promote growth of weeds or other undesirable plants.

26. A seed containing growth medium according to claim 1 wherein carrier and cover sheets are made from polyurethane materials and/or paper.

27. A seed-containing growth medium according to claim 1 wherein at least the cover sheet is of foam with a physical melting point in the range 140° C.–270° C.

28. A seed-containing growth medium according to claim 1 wherein at least the cover sheet is of foam with a tensile strength in the range 25–55 kPa.

29. A seed-containing growth medium according to claim 1 wherein at least the cover sheet is of foam with an elongation in the range 40%–300%.

30. A seed-containing growth medium according claim 29 wherein at least the cover sheet is of foam with an elongation in the range 100%–250%.

31. A seed-containing growth medium according to claim 1 wherein at least the cover sheet is of foam with a density in the range of 35–65 kg/m$^3$.

32. A seed-containing growth medium according to claim 1 wherein at least the cover sheet is of foam comprising an open celled matrix consisting of 30–75 cells per linear inch (CPI) (per 25 mm).

33. A seed-containing growth medium according to claim 1 wherein at least the cover sheet is of foam with a 40% compression load deflection hardness (CLD) in the range 1.2–2.1 kPa.

34. A seed-containing growth medium according to claim 1 wherein at least the cover sheet is of foam with a water droplet absorption time in the range 1–15 seconds.

35. A seed-containing growth medium according to claim 1 wherein at least the cover sheet is of foam with a complete upper surface wetting time in the range 1–50 minutes.

36. A seed-containing growth medium according to claim 1 wherein at least the cover sheet has a tear strength in the range of 1 to 10 Newtons per 25 mm.

37. A seed-containing growth medium according to claim 1 wherein at least the cover sheet is of foam which as manufactured has a water content in the range 2 to 6 parts by weight.

38. The seed containing growth medium according to claim 1 wherein the containment zones are trapezoidal in shape.

39. The seed containing growth medium according to claim 1 wherein the containment zones are elliptical in shape.

40. The seed containing growth medium according to claim 1 wherein each seed is sealed in the containment zones with a spacing of 10–25% of the longest dimension of the seed around the seed.

41. The seed containing growth medium according to claim 40, wherein the spacing is 10–15%.

42. A seed-containing growth medium for promoting the growth of a root and a shoot from said seed comprising:

a flexible carrier sheet, and a cover sheet, said cover sheet overlying the carrier sheet, wherein the physical characteristics of the sheets differ such that the carrier sheet has a higher water retentive capacity than the cover sheet, and the cover sheet is more easily penetrated than the carrier sheet, the said carrier sheet and cover sheet having attached parts at selected discrete contact points to provide a plurality of containment zones, said attached parts of the said carrier sheet and cover sheet delimiting the extent of said containment zones to configure said containment zones to define pockets for surrounding and entrapping at least one seed therein, the configuration of said pockets being such as to both inhibit lateral expansion of the root or shoot and encourage the penetration of the cover sheet by said shoot.

* * * * *